United States Patent
Welsch

(10) Patent No.: US 7,820,298 B2
(45) Date of Patent: Oct. 26, 2010

(54) ANTIFRICTION COMPOSITE MULTILAYER STRIP AND BEARING PART THEREFROM

(75) Inventor: Klaus Welsch, Breckerfeld (DE)

(73) Assignee: Huhoco Metalloberflachenveredelung GmbH, Wuppertal (DE)

( * ) Notice: Subject to any disclaimer, the term of this patent is extended or adjusted under 35 U.S.C. 154(b) by 717 days.

(21) Appl. No.: 11/408,517

(22) Filed: Apr. 21, 2006

(65) Prior Publication Data

US 2006/0251887 A1 Nov. 9, 2006

(30) Foreign Application Priority Data

Apr. 29, 2005 (DE) .................. 20 2005 006 868 U

(51) Int. Cl.
*B32B 17/10* (2006.01)

(52) U.S. Cl. .................. 428/457; 428/339; 428/521

(58) Field of Classification Search ................. None
See application file for complete search history.

(56) References Cited

U.S. PATENT DOCUMENTS

| 4,115,614 A | | 9/1978 | Martin | |
|---|---|---|---|---|
| 4,556,151 A | * | 12/1985 | Taira et al. | 220/612 |
| 5,304,422 A | * | 4/1994 | Tanabe et al. | 428/392 |
| 6,703,437 B1 | * | 3/2004 | Kamiyama et al. | 524/421 |
| 2002/0031684 A1 | * | 3/2002 | Niegel et al. | 428/675 |
| 2004/0071887 A1 | * | 4/2004 | Newton | 427/386 |

FOREIGN PATENT DOCUMENTS

| BE | 639 653 | 5/1964 |
|---|---|---|
| DE | 1 105 154 | 4/1961 |
| DE | 10 2004 020 385 | 12/2004 |
| EP | 0 978 528 B | 5/2004 |
| FR | 2477 065 | 3/1981 |
| GB | 541252 | 5/1941 |
| WO | WO 01/55607 A1 | 8/2001 |

* cited by examiner

*Primary Examiner*—D. Lawrence Tarazano
*Assistant Examiner*—Gregory Clark
(74) *Attorney, Agent, or Firm*—Brinks Hofer Gilson & Lione

(57) ABSTRACT

An antifriction composite system (1) for a bearing part (2), such as a sliding bearing part, with a metallic backing (3) and a functional coating (4), which comprises a top layer (5) with a friction-reducing effect. The functional coating (4) has an elastomer layer (6) lying directly under the top layer (5). The invention also relates to a bearing part (2) with an antifriction composite system (1) of this type.

33 Claims, 2 Drawing Sheets

ANTIFRICTION COMPOSITE MULTILAYER STRIP AND BEARING PART THEREFROM

BACKGROUND AND SUMMARY OF THE INVENTION

The present invention relates to an antifriction composite system for a bearing part, such as a sliding bearing bushing, with a metallic backing and a functional coating which comprises an anti-friction top layer. Furthermore, the present invention relates to a bearing part with an antifriction composite system of this type.

A composite system of the above-described type is known for example from DE 10 2004 020 385 A1. Described there is a method for producing sliding bearing bushing which have a metal casing as the backing, provided on the outside with an anticorrosive layer, and have a sliding layer of plastic, an anticorrosive agent in powder form being mechanically applied to form the anticorrosive layer.

To produce the bushing by the method for the intended application, among the material systems that are used are those known by the name NORGLIDE®. These are material composites comprising in particular compounded PTFE films on a metal backing, for example in the form of a metal gauze or mesh, an expanded metal, for example bronze-based expanded metal, or a solid steel back, for example a cold-rolled strip. When used for the production of bearing elements—with machining sometimes required—the systems are intended to ensure a great load-bearing capacity, in particular pressure absorption, low coefficients of friction in the tribological system, wear resistance and a long service life as well as freedom from maintenance—even when exposed to dust and/or moisture.

The set of requirements imposed on bearing elements, as are used for example as bushing in the furniture industry, in mechanical engineering and in automobile construction, varies to some extent. In automobile construction, for example, Volkswagen AG is bound by the company standard TL 257 (December 2002), which relates to "PTFE composite film with metal" and in which composite systems of the type mentioned above are described—including the requirements imposed on them, such as tensile, compressive and flexural load-bearing capacity.

The presence of certain fillers, such as for example graphite, in an antifriction composite system also makes it possible to control the electrical conductivity of bearing elements, this conductivity being determined not only by the type of filler but also by the nature and size of a contact area between the bearing and the shaft, the material thickness and the effective surface pressure. The increased conductivity serves in this case in particular for prevention with regard to the possible occurrence of undesired electrical charges of the components.

Further requirements for composite systems of the type mentioned above may arise from the fact that mechanical resistance under alternating stress, shock absorption or sound isolation, in particular to prevent the occurrence of disturbing sound, are necessary or desirable for some applications.

The known antifriction composite systems have a series of disadvantages here, such as a complex production process, which is caused by the use of highly cost-intensive materials, for example thick-walled PTFE films, or by the necessity for chemical, galvanic or—as in the case of DE 10 2004 020 385 A1—mechanical treatment operations, which in some cases are highly time-intensive. Among the weaknesses, one in particular is that of inadequate resistance, in particular thermal resistance, of the adhesive that is used to laminate the functional coating onto the backing.

The present invention is based on the object of providing an antifriction composite system of the type mentioned above and a bearing part which are distinguished by a simple and low-cost method of production and which meet the aforementioned requirements, in particular with regard to resistance to alternating stress and shock as well as sound absorption.

This object is achieved for the antifriction composite system of the type mentioned above by the functional coating having an elastomer layer lying directly under the top layer. The bearing part according to the invention is provided with the antifriction composite system according to the invention.

The invention produces many advantages with respect to technical aspects of its production and application.

For instance, the properties of the elastomer, which are to a great extent freely determinable, such as for example its Shore hardness, allow a desired resilience under shock loading to be specifically set.

The formation of an intimate bond of the elastomer layer with the metallic backing which may be promoted by an adhesion promoting layer interposed—and the top layer with a friction-reducing effect makes it possible to dispense with the use of a customary adhesive, and consequently also increase the thermal resistance of the entire composite system according to the invention.

Similarly, the state of edges of a bearing part, such as a sliding bearing bushing, which is produced from the antifriction composite system according to the invention can be improved—in particular with the effect that more efficient protection against substances with a delaminating effect getting under the top layer is achieved.

Apart from improved sound isolation, with the invention it is also possible if need be to set a desired, variably increased electrical conductivity or coloration.

A variation that is possible in the µm range of all the layers located on the backing, it being possible in particular for the top layer to be a layer containing a plastic or a plastics compound that comprises a polymer as the main constituent, particularly a fluorine-containing polymer, such as PTFE, allows dimensions that will produce exact fits to be set without the use of machining.

Finally, it is advantageously possible to produce an antifriction composite system by using the coil-coating method, i.e. a continuous and therefore comparatively less complex process, because the layer structuring according to the invention allows rolling up into a roll and unrolling from a roll to be ensured without damage—both in intermediate production steps and in the final state.

BRIEF DESCRIPTION OF THE DRAWINGS

The invention is explained in more detail on the basis of the exemplary embodiments that are represented in the accompanying figures of the drawing, in which.

DETAILED DESCRIPTION OF THE INVENTION

Figure 1:
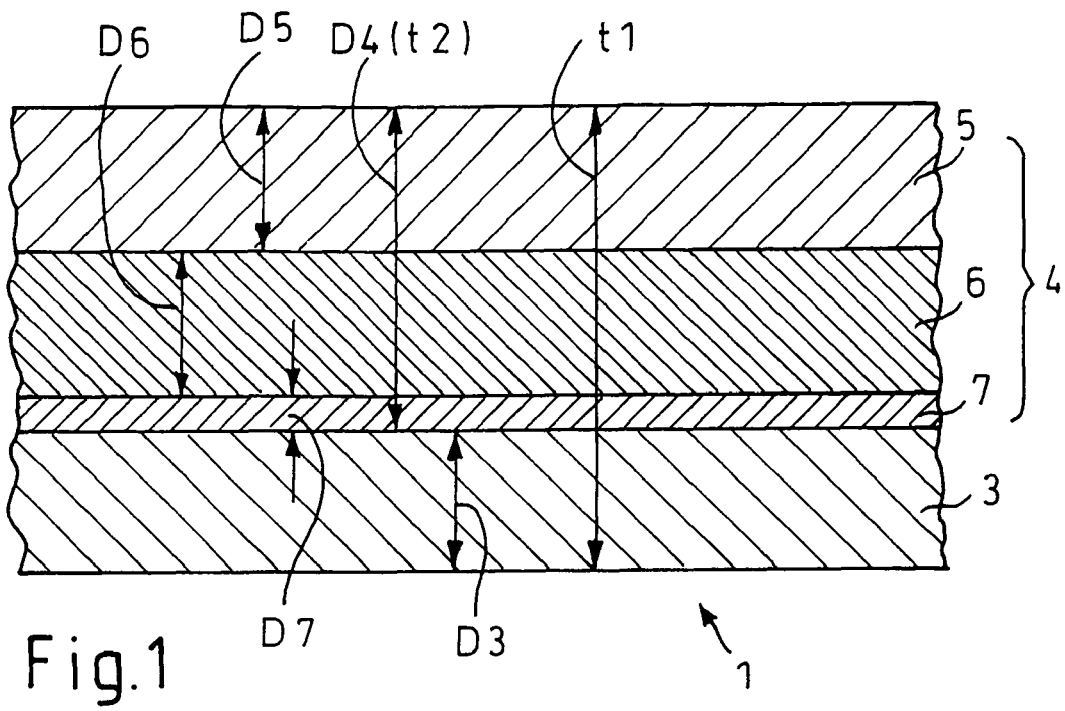
FIG. 1 shows an antifriction composite system according to the invention in cross section.

In the various figures of the drawing, the same parts are generally always provided with the same designations, so that they are also only described once in each case.

Figure 2:
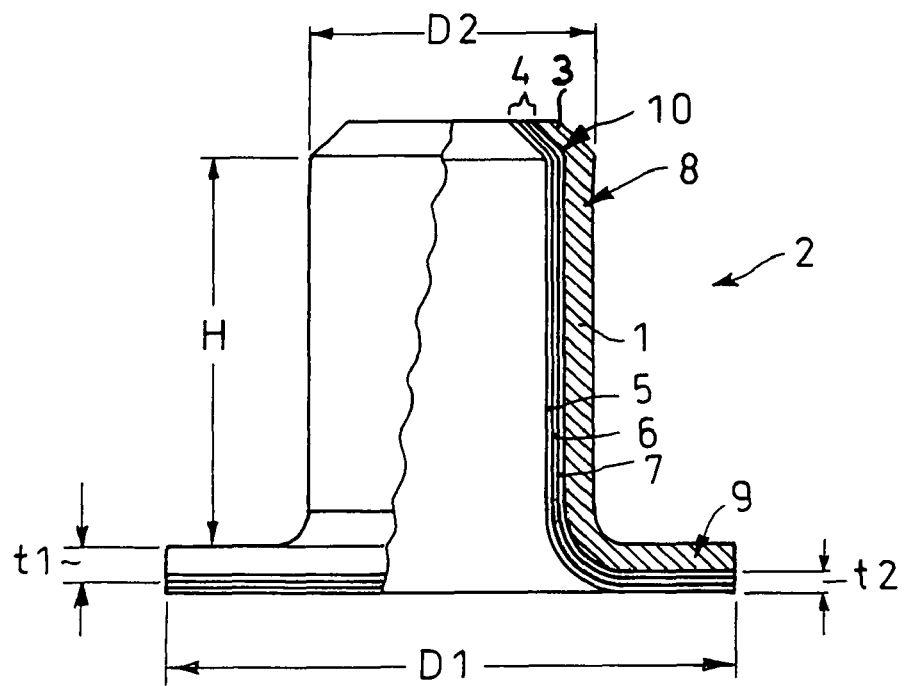
FIG. 2 shows a bearing part with an antifriction composite system according to the invention, partly in section.

As shown firstly by FIG. 1, an antifriction composite system 1 according to the invention for a bearing part 2, as represented in FIG. 2 by way of example as a sliding bearing bushing, has a metallic backing 3 and a functional coating 4, which comprises a top layer 5 with a friction-reducing effect. The functional coating 4 in this case also comprises, according to the invention, an elastomer layer 6, lying directly under the top layer 5.

The variety of materials that can be used to form the elastomer layer 6 is broad and ranges for example from NBR coatings through EPDM and HNBR coatings to FPM coatings. Natural rubber may also be used.

The elastomer layer 6, formed in particular with a smooth surface, may advantageously have an average thickness D6 in the range from 5 µm to 120 µm, and preferably for one embodiment of the invention in the range from 25 µm to 50 µm.

As further shown in FIG. 1, in the case of the preferred embodiment of the antifriction composite system 1 according to the invention that is represented, it is provided that the elastomer layer 6 is bonded to the backing 3 by means of an adhesion promoting layer 7—also referred to as a primer. The adhesion promoting layer 7 may preferably have an average thickness D7 in the range from 0.5 µm to 5 µm, and preferably for one embodiment of the invention in the range from 1.0 µm to 2.0 µm, and ensures the required adhesive bond between the metallic backing 3 and the elastomer.

The functional coating 4 is consequently formed by the top layer 5 with a friction-reducing effect, the elastomer layer 6 and the adhesion promoting layer 7 and may be made electrically conductive as a whole, or in individual layers, primarily with the aim of preventing electrostatic charging of the component.

The top layer 5 with a friction-reducing effect may in this case preferably be a layer containing a plastic or a plastics compound that comprises a polymer as the main constituent, particularly a fluorine-containing polymer, such as PTFE, it being possible with particular preference for the top layer 5 with a friction-reducing effect to be a film layer of lacquer.

The top layer 5 with a friction-reducing effect, formed like the elastomer layer 6 in particular with a uniform thickness, may advantageously have an average thickness D5 in the range from 2 µm to 220 µm, and preferably for one embodiment of the invention in the range from 30 µm to 90 µm.

In a preferred embodiment, the metallic backing 3 may be in the form of a strip, and in particular consist of cold-rolled strip steel, and preferably for one embodiment of the invention of quality grades DC 01 to DC 04 as specified by DIN EN 10 139, of sheet or back plate or of a high-grade steel, aluminum or nonferrous metal strip. Corresponding alloys, such as brass, may also be used here. It is therefore possible in a technologically extremely advantageous way to produce the antifriction composite system 1 according to the invention by the coil-coating method, i.e. in a continuous process from roll to roll. The strip with the metallic backing 3 can in this case be unwound from one roll ("coil"), coated while running flat through a coating system and subsequently be wound up again to form a roll. In the case of coating on both sides, an upper-side and under-side coating of the backing 3 is possible in one pass—in particular in a stage of the method in which the top layer 5 is applied as a film layer of lacquer.

A bearing part 2 according to the invention may be—as the embodiment represented in FIG. 2 shows—for example a sleeve provided with the antifriction composite system 1 according to the invention, which sleeve has a hollow-cylindrical basic body 8 with a flange attachment 9 on one end face and if appropriate—as represented—with a cone portion 10 on the other end face, and which is intended in particular for receiving a rotating shaft.

The bearing part 2 according to the invention is coated on the inner wall of the cylindrical basic body 8 and on the end face of the flange attachment 9 and with a continuous, consistent antifriction composite system 1 according to the invention in a uniform thickness t2. In FIG. 1, the thickness D4 of the functional coating 4 corresponds to this thickness t2.

An average total thickness t1, formed from the thickness D3 of the backing 3 and the thickness t2/D4 of the functional coating 4, may in this case preferably lie in the range from 0.2 mm to 1.5 mm, in particular for an embodiment of this invention, in the range from 0.5 mm to 1.2 mm.

The other main dimensions represented in FIG. 2 of the bearing part 2 according to the invention, such as the diameter D1 of the flange attachment 9, the outside diameter D2 of the cylindrical basic body 8 and its length, denoted by the designation H, may in this case be chosen from the aspect of the manner of production provided with preference, to correspond to the limiting drawing ratio of the material of the backing 3.

Figure 3:
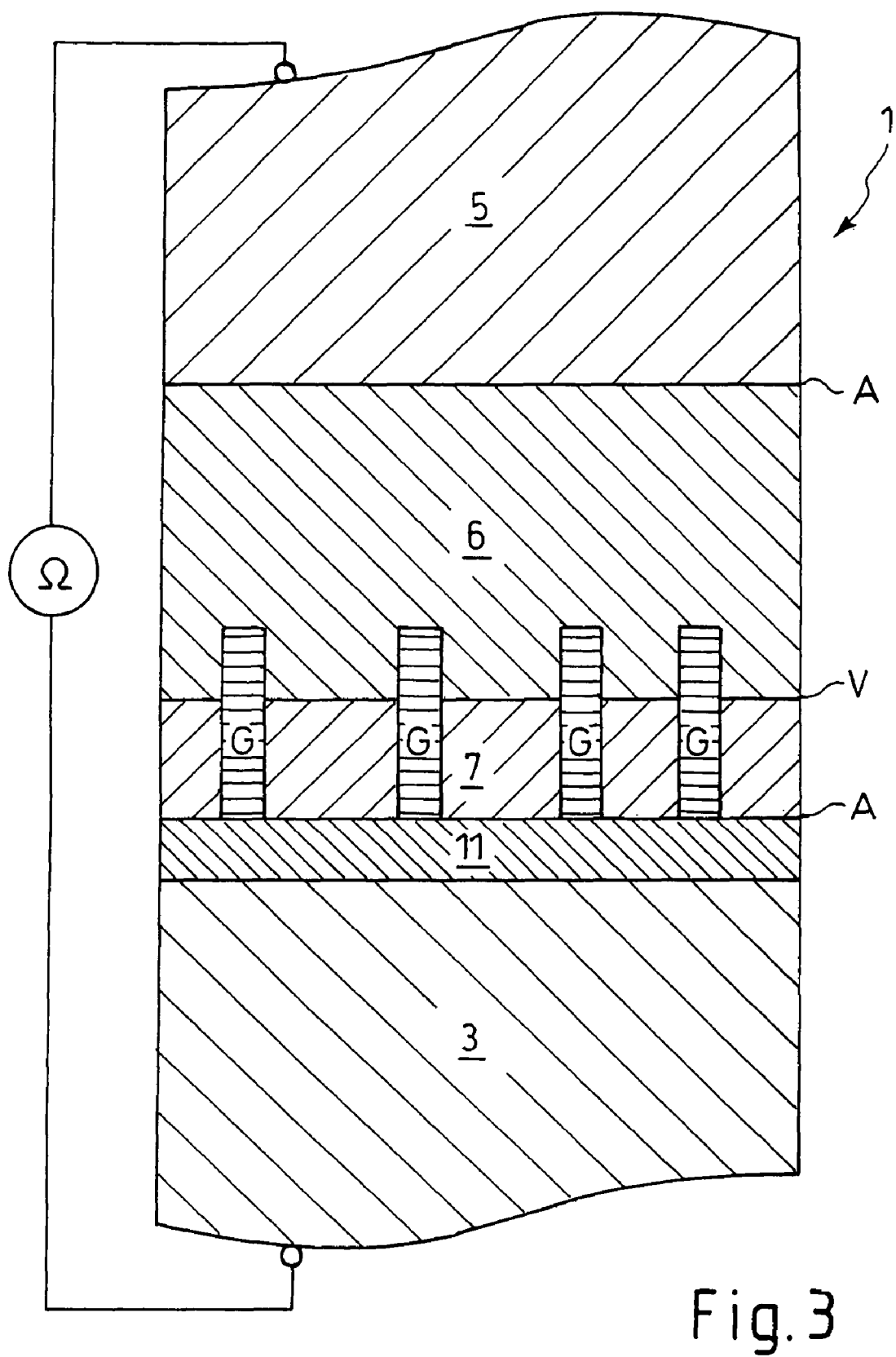
FIG. 3 shows in schematized form a further antifriction composite system according to the invention in cross section.

As already mentioned, FIG. 3 shows in a schematized representation a further embodiment of an antifriction composite system 1 according to the invention, with its backing 3, in particular a metallic backing, and the functional layer 4 located on it. Apart from the top layer 5, the elastomer layer 6 and the adhesion promoting layer 7, on the backing 3 and under the adhesion promoting layer 7 there is—by contrast with the embodiment in FIG. 1—also a passivation layer 11 in the functional coating 4. The various layer thicknesses are not denoted, but may assume approximately the same values as were mentioned in the description of the first exemplary embodiment.

Virtually all metals that can be supplied in strip form, such as for example aluminum, steel, high-grade steel, stainless high-grade steel, copper, brass etc., come into consideration as materials for the backing 3.

In the production of the antifriction composite system 1 according to the invention, in particular a pretreatment of the backing 3 may firstly be provided, comprising cleaning, decreasing and—to form the passivation layer 11, passivating of the surface. The passivation may comprise—for example for ferrous materials, phosphating and especially for aluminum chromating. All the pretreatment processes may be arranged ahead of the actual coating process in one pass of the preferably strip-like backing 3 through suitable treatment devices that are known per se.

Like the elastomer layer 6 and the top layer 5, the adhesion promoting layer 7 may preferably, as already indicated, be applied by the roller application method by means of metering rollers. This allows the layer thicknesses to be set with great uniformity and accuracy. The solids content in the solvent-containing wet lacquer that can be used for forming the adhesion promoting layer 7 is in this case advantageously 20% w/w to 40% w/w, in particular approximately 30% w/w. In this way, the flow properties, especially the viscosity, of the lacquer, can be set to an optimum value. After drying, the dry film remains on the strip with a layer thickness D7 of preferably less than 5.0 µm. For drying, a strip dryer can be used in particular, allowing the setting of a specific temperature gradient that is favorable for the treatment of the lacquer in an advantageously continuous mode of operation. Great adhesive bonding, which in FIG. 3 is symbolized by the point A at the transition between the passivation layer 11 and the adhesion promoting layer 7, may be advantageously provided here by phenolic resins in the wet lacquer, the percentage by weight of which in the dried adhesion promoting layer 7 is preferably less than 2%.

The dry film of the adhesion promoting layer 7 consequently comprises polymers with optionally fillers, and crosslinking agents which, with the gentle drying, do not yet chemically react. Graphite, preferably in a highly pure powdered form, may also be added by "alloying", which is illustrated in FIG. 3 by the regions represented as rectangles and marked by the designation G. The average grain size of the graphite G may in this case preferably lie in a range of less than 50 μm, this grain size then being significantly greater—for example 5 to 10 times greater—than granular surface structures present in the dry film of the adhesion promoting layer 7.

The particles of the graphite G may in this case protrude in particular out of the adhesion promoting layer 7 and into the elastomer layer 6. Between the adhesion promoter and the elastomer there normally forms a boundary layer, increasing the electrical resistance, through which the crosslinking of the polymers takes place. However, the graphite particles G protruding out of the adhesion promoting layer 7 provide an increased electrical conductivity into the elastomer layer 6. The bonding of the graphite G in the dry film is in this case so good that the surface is abrasion-resistant, even if the composite system 1 according to the invention is rolled. The electrical conductivity can be controlled in accordance with the task to be performed by the composite system 1 according to the invention by means of the percentages by weight of graphite G. Even percentages by weight of significantly less than 5% are sufficient to minimize the surface resistivity (measurement as specified by DIN IEC 93, VDE 0303 part 30, probe measurement) to a value which corresponds to multiplication of the original value by a factor of 0.02.

The elastomer layer 6 may be formed of rubber, in particular, NBR, because of its superior permanently elastic properties, and if appropriate FKM for use in fluid media, can be applied, like the adhesion promoter 7, as a solvent-containing wet lacquer, but in particular in a number of passes and layers. The wet lacquer or the elastomer solution may in this case advantageously have a solids content of less than 30% w/w. After gentle drying—once again preferably in the strip dryer, polymers, carbon blacks, graphite, fillers and crosslinking agents then remain in the dry film. The hardness of the crosslinked layers (measured in Shore A) can in this case be controlled by means of the choice and amount of carbon blacks and be adapted to the respective task. An electrical conductivity of the elastomer layer 6 is already provided if carbon blacks are present, but can be specifically controlled, i.e. further reduced, by additionally adding graphite G. In this respect, even large amounts of graphite G do not appreciably disturb the vulcanizing properties, and the volume resistivity (measurement as specified by DIN IEC 93, VDE 0303 part 30) of the elastomer layer 6 can become virtually zero.

After reaching the desired layer thickness, the elastomer layer 6, comprising a number of sub-layers after the application of the rubber solution, is crosslinked in itself, and with the adhesion promoting layer 7 lying under it, in the final pass. For this purpose and in accordance with the desired physical properties, a time-temperature window is prescribed for the drying, permitting partial or complete crosslinking of the entire elastomer layer 6 by means of the reactions thereby initiated, for example vulcanization by means of sulfur bridges. In FIG. 3, the designation V stands here for the crosslinking with the adhesion promoting layer 7 lying under the elastomer layer 6.

As already mentioned, if, as preferably intended, the top layer 5 with a friction-reducing effect contains polytetrafluoroethylene (PTFE), it may also be applied as a wet film. Here, too, greater dry film layer thicknesses (layer thickness D5) can also be achieved by successive application and drying of a number of wet films. The lacquer should in this case preferably have a solids content of more than 50% w/w. The adhesive function, once again symbolized by the point A in FIG. 3 at the transition of the elastomer layer 6 to the top layer 5, may preferably be provided by a PU resin, the proportion of which as a percentage of the solids is preferably about 64% w/w, or more, the proportion of PTFE being approximately 27% w/w, or more.

The electrical conductivity and the tribological properties can also be controlled in the top layer 5 by incorporation of graphite G, the nature of which may, in particular, be the same as mentioned in the description of the adhesion promoting layer. The proportion by mass as a percentage of the solids may in this case be advantageously greater than 30%. The electrical conductivity thereby increases significantly, which is manifested for example by the volume resistivity of the top layer 5 being reduced by a proportion of graphite G of approximately 25% to a fraction of its original value (divisor approximately $10^{10}$).

Among the results that can be achieved by the way in which the antifriction composite system 1 is constructed according to the invention is that the properties of the PTFE used in the top layer that are extremely advantageous for applications, such as high chemical and thermal resistance, low coefficient of friction etc., come fully to bear, while properties that may have disadvantageous effects for applications, such as high coefficient of thermal expansion and low surface hardness, are compensated in their effect. In the antifriction composite system. 1 according to the invention, the partial functions corresponding to the overall technical requirements are advantageously performed in a synergistic way in each case by the components which have the best suitability for the respective partial function, such as the determination of the sliding characteristics of the top layer 5 by a fluorocarbon plastic or the setting of damping and vibration isolation in the elastomer layer 6 by use of rubber. In this case, the electrical properties are variable and can be changed for example from batch to batch, which is illustrated in FIG. 3 by the use of the circuitry symbol indicating an ohmmeter (designation Ω), symbolizing a resistance measurement.

In this connection it is also stated that, in its preferred strip-like form, the antifriction composite system 1 according to the invention is also bent at the edges, in particular formed or deformed in the cold state, such as deep-drawn, or worked in some other way, preferably punched or perforated, without any damage or delamination of the functional coating 4 from the backing 3 occurring.

In spite of the presence of an uncoated cut edge after a severing operation, an antifriction composite system 1 according to the invention has a higher corrosion resistance than a metal strip that has only been coated after its processing, because said cut edge, though not coated, has being through the cleaning and pretreatment with the backing 3.

The invention is not restricted to the exemplary embodiments above, but also covers all equivalent embodiments. For example, instead of or in addition to the passivation layer 11 described, it is possible to apply to the surface of the backing 3, at least partially, one or more further functional layers, for example containing zinc, chromium and or silicone, as (an) anticorrosive and/or sealing layer(s).

There are also a wide variety of further advantageous design possibilities for the antifriction composite system 1 according to the invention or bearing parts according to the invention produced by using it, for example, as already mentioned, coating of the backing 3 with the functional coating 4 on both sides.

While the above description constitutes the preferred embodiment of the present invention, it will be appreciated that the invention is susceptible to modification, variation and change without departing from the proper scope and fair meaning of the accompanying claims.

The invention claimed is:

1. An antifriction composite multilayer strip for use as a bearing part, such as a sliding bearing bushing comprising, a metallic backing in the form of a strip and a functional coating, the functional coating comprises a top layer with a friction-reducing effect, the top layer having a uniform thickness in the range from 2 µm to 220 µm, and an elastomer layer lying directly under the top layer, the elastomer layer having a smooth surface and a thickness in the range from 5 µm to 120 µm;

wherein the metallic backing has a first and second side, the elastomer layer being coupled to at least one of the first and second sides of the metallic backing;

wherein the top layer and the elastomer layer are film layers of dried lacquers forming such an intimate adhesive bond with each other that the antifriction composite multilayer strip is processable by rolling up into a roll and unrolling from the roll or deforming in the cold state without any damage or delamination of the functional coating from the backing.

2. The composite strip as claimed in claim 1, wherein the elastomer layer is produced from a group of one or more of synthetic rubber, including NBR, EPDM, HNBR or FBM, or from natural rubber.

3. The composite strip as claimed in claim 1, wherein the elastomer layer contains polymers, with one or more of carbon black, graphite, fillers or crosslinking agents.

4. The composite strip as claimed in one of claim 1, wherein a hardness of the elastomer layer, measured in Shore A, is fixed by the amount of carbon black contained in the elastomer layer.

5. The composite strip as claimed in claim 1, wherein the elastomer layer is bonded to the metal backing by means of an adhesion promoting layer.

6. The composite strip as claimed in claim 1, wherein the top layer is a layer containing one or more of a plastic or a plastics compound which comprise a polymer as a main constituent, a fluorine-containing polymer, and PTFE.

7. The composite strip as claimed in claim 1, wherein one or more of the top layer, the elastomer layer and the adhesion promoting layer is a film layer, which is formed by means of metering rollers, and drying, applied as a solvent-containing wet lacquer.

8. The composite strip as claimed in claim 7, wherein a solids content in a solvent-containing wet lacquer for forming the adhesion promoting layer is 20% w/w to 40% w/w or approximately 30% w/w.

9. The composite strip as claimed in claim 7, wherein the solvent-containing wet lacquer for forming the adhesion promoting layer contains at least one phenolic resin.

10. The composite strip as claimed in claim 9, wherein a solids content of a phenolic resin for forming the adhesion promoting layer is less than 2% w/w.

11. The composite strip as claimed in claim 7, wherein a solids content in a solvent-containing wet lacquer for forming the elastomer layer is less than approximately 30% w/w.

12. The composite strip as claimed in claim 7, wherein the solvent-containing wet lacquer or a rubber solution used for forming the elastomer layer is applied and dried in a number of sub-layers.

13. The composite strip as claimed in claim 7, wherein the materials used for forming the elastomer layer and the adhesion promoting layer are crosslinked with one another.

14. The composite strip as claimed in claim 7, wherein a solids content in a solvent-containing wet lacquer for forming the top layer is more than approximately 50% w/w.

15. The composite strip as claimed in claim 7, wherein the solvent-containing wet lacquer for forming the top layer contains at least one PU resin.

16. The composite strip as claimed in claim 1, wherein a solids content in the top layer of a resin for forming the top layer is approximately 64% w/w or more.

17. The composite strip as claimed in claim 1, wherein the top layer, the elastomer layer and the adhesion promoting layer are electrically conductive.

18. The composite strip as claimed in claim 5, wherein the top layer, the elastomer layer and the adhesion promoting layer contain graphite.

19. The composite strip as claimed in claim 18, wherein a proportion of graphite in the top layer is greater than 30% w/w.

20. The composite strip as claimed in claim 18, wherein a proportion of graphite in the adhesion promoting layer is less than 5% w/w.

21. The composite strip as claimed in claim 18, wherein the graphite is in the form of particles which protrude out of the adhesion layer into the elastomer layer.

22. The composite strip as claimed in claim 1, wherein one or more functional layers, containing zinc, chromium or silicone, is applied to a surface of the backing as an anticorrosive or sealing layer.

23. The composite strip as claimed in claim 1, wherein the top layer is formed with an average thickness in the range from 30 µm to 90 µm.

24. The composite strip as claimed in claim 1, wherein the metallic backing is of cold-rolled strip steel, of quality grades DC 01 to DC 04 as specified by DIN EN 10 139, of sheet or back plate, or of a high-grade steel, aluminum or nonferrous metal strip.

25. The composite strip claimed in claim 1, wherein an average total thickness t1, formed from a thickness D3 of the backing and a thickness D4 of the functional coating, lies in the range from 0.2 mm to 1.5 mm, or in the range from 0.5 mm to 1.2 mm.

26. The composite strip as claimed in claim 1, wherein the elastomer layer has an average thickness D6 in the range from 25 µm to 50 µm.

27. The composite strip as claimed in claim 5, wherein the adhesion promoting layer has an average thickness D7 in the range from 0.5 µm to 5 µm, or in the range from 1.0 µm to 2.0 µm.

28. The composite strip as claimed in claim 1, wherein the functional coating is applied to the metallic backing on the first and second sides of the backing.

29. The composite strip as claimed in claim 1, is rolled up into a roll or unrolled from a roll without being damaged, which allows continuous production by a coil-coating method.

30. A bearing part providing for mechanical resistance under alternating stress, shock absorption or sound isolation, the bearing part being formed from the composite strip of claim 1.

31. The bearing part as claimed in claim 30, wherein the bearing part is formed as a sleeve, the sleeve having a hollow-cylindrical basic body with a flange attachment on one end face and adapted to receive a rotating shaft.

32. The bearing part as claimed in claim 31, wherein the wall of the hollow-cylindrical basic body and of the flange attachment is formed by the metallic backing of the composite strip and wherein the inner side of the wall and the end face of the flange attachment are coated with the functional coating.

33. The bearing part as claimed in claim 31, wherein a diameter D1 of the flange attachment and an outside diameter D2 and a length of the hollow-cylindrical basic body, are dimensioned to correspond to the limiting drawing ratio of the material of the backing.

* * * * *